United States Patent
Wein et al.

(10) Patent No.: US 11,479,127 B2
(45) Date of Patent: Oct. 25, 2022

(54) ALL-WHEEL SYSTEM FOR AN ELECTRIC MOTOR VEHICLE, AND METHOD FOR OPERATING AN ALL-WHEEL SYSTEM OF SUCH A VEHICLE

(71) Applicant: AUDI AG, Ingolstadt (DE)

(72) Inventors: Michael Wein, Seubersdorf (DE); Michael Bär, Ingolstadt (DE); Christian Graf, Ingolstadt (DE); Karl-Heinz Meitinger, Munich (DE)

(73) Assignee: AUDI AG, Ingolstadt (DE)

( * ) Notice: Subject to any disclaimer, the term of this patent is extended or adjusted under 35 U.S.C. 154(b) by 825 days.

(21) Appl. No.: 16/346,918

(22) PCT Filed: Nov. 22, 2017

(86) PCT No.: PCT/EP2017/080005
§ 371 (c)(1),
(2) Date: May 2, 2019

(87) PCT Pub. No.: WO2018/095950
PCT Pub. Date: May 31, 2018

(65) Prior Publication Data
US 2020/0055408 A1    Feb. 20, 2020

(30) Foreign Application Priority Data
Nov. 23, 2016    (DE) ..................... 10 2016 223 186.3

(51) Int. Cl.
*B60K 1/02* (2006.01)
*B60L 15/20* (2006.01)
(Continued)

(52) U.S. Cl.
CPC ............ *B60L 15/2036* (2013.01); *B60K 1/02* (2013.01); *B60K 1/04* (2013.01); *B60K 17/24* (2013.01);
(Continued)

(58) Field of Classification Search
CPC .......... B60L 15/2036; B60L 2240/421; B60L 2240/423; B60L 2260/28; B60L 15/2072;
(Continued)

(56) References Cited

U.S. PATENT DOCUMENTS

| 8,708,074 B1 | 4/2014 | McCoy et al. |
| 2008/0234858 A1 | 9/2008 | Dollens |

(Continued)

FOREIGN PATENT DOCUMENTS

| CN | 102858580 A | 1/2013 |
| CN | 103153675 A | 6/2013 |

(Continued)

OTHER PUBLICATIONS

Examination Report dated Sep. 18, 2017 of corresponding German application No. 10 2016 223 186.3; 12 pages.

(Continued)

*Primary Examiner* — Justin Holmes
(74) *Attorney, Agent, or Firm* — Maier & Maier, PLLC

(57) ABSTRACT

An all-wheel system for a motor vehicle, with a first electric machine for driving a first drive axle of the motor vehicle; a first electronic power unit for controlling a rotational speed of the first electric machine; a second electric machine for driving a second drive axle of the motor vehicle; a second electronic power unit for controlling the rotational speed of the second electric machine on the basis of the rotational speed of the first electric machine and a specified differential rotational speed between the first electric machine and the second electric machine.

9 Claims, 1 Drawing Sheet

(51) Int. Cl.
  *B60K 1/04* (2019.01)
  *B60K 17/24* (2006.01)
  *B60K 17/354* (2006.01)
  *B60K 17/356* (2006.01)
  *H02P 5/50* (2016.01)
  *B60K 1/00* (2006.01)

(52) U.S. Cl.
  CPC .......... *B60K 17/354* (2013.01); *B60K 17/356* (2013.01); *H02P 5/50* (2013.01); *B60K 2001/001* (2013.01); *B60L 2240/421* (2013.01); *B60L 2240/423* (2013.01); *B60L 2260/28* (2013.01)

(58) Field of Classification Search
  CPC .......... B60L 3/106; B60L 15/20; B60K 1/02; B60K 1/04; B60K 17/24; B60K 17/354; B60K 17/356; B60K 2001/001; B60K 1/00; H02P 5/50; B60W 2510/081; B60W 2710/081; B60W 2720/403; Y02T 10/64; Y02T 10/72
  See application file for complete search history.

(56) References Cited

U.S. PATENT DOCUMENTS

| | | |
|---|---|---|
| 2010/0187024 A1 | 7/2010 | Tang |
| 2014/0005864 A1* | 1/2014 | Holmes .................. B60K 6/52 180/65.265 |
| 2014/0343770 A1 | 11/2014 | Sponheimer et al. |

FOREIGN PATENT DOCUMENTS

| | | |
|---|---|---|
| CN | 103781650 A | 5/2014 |
| CN | 103863078 A | 6/2014 |
| CN | 104812609 A | 7/2015 |
| CN | 105142966 A | 12/2015 |
| CN | 105473399 A | 4/2016 |
| CN | 105793089 A | 7/2016 |
| DE | 102011111775 A1 | 3/2012 |
| DE | 102011100814 A | 11/2012 |
| DE | 102013206379 A1 | 10/2014 |
| DE | 112013003790 T5 | 4/2015 |
| DE | 102015000216 A1 | 9/2015 |
| DE | 112014002414 T5 | 2/2016 |
| KR | 200460108 Y1 * | 5/2012 |
| WO | 2012045386 A1 | 4/2012 |

OTHER PUBLICATIONS

International Search Report and Written Opinion of the International Searching Authority dated Mar. 7, 2018 in corresponding International application No. PCT/EP2017/080005; 19 pages.

Office Action dated Nov. 26, 2021, in connection with corresponding Chinese Application No. 201780072484.2 (10 pp., including machine-generated English translation).

Translation of International Preliminary Report on Patentability (Chapter 1) dated Jun. 6, 2019, of corresponding International application No. PCT/EP2017/080005; 6 pages.

* cited by examiner

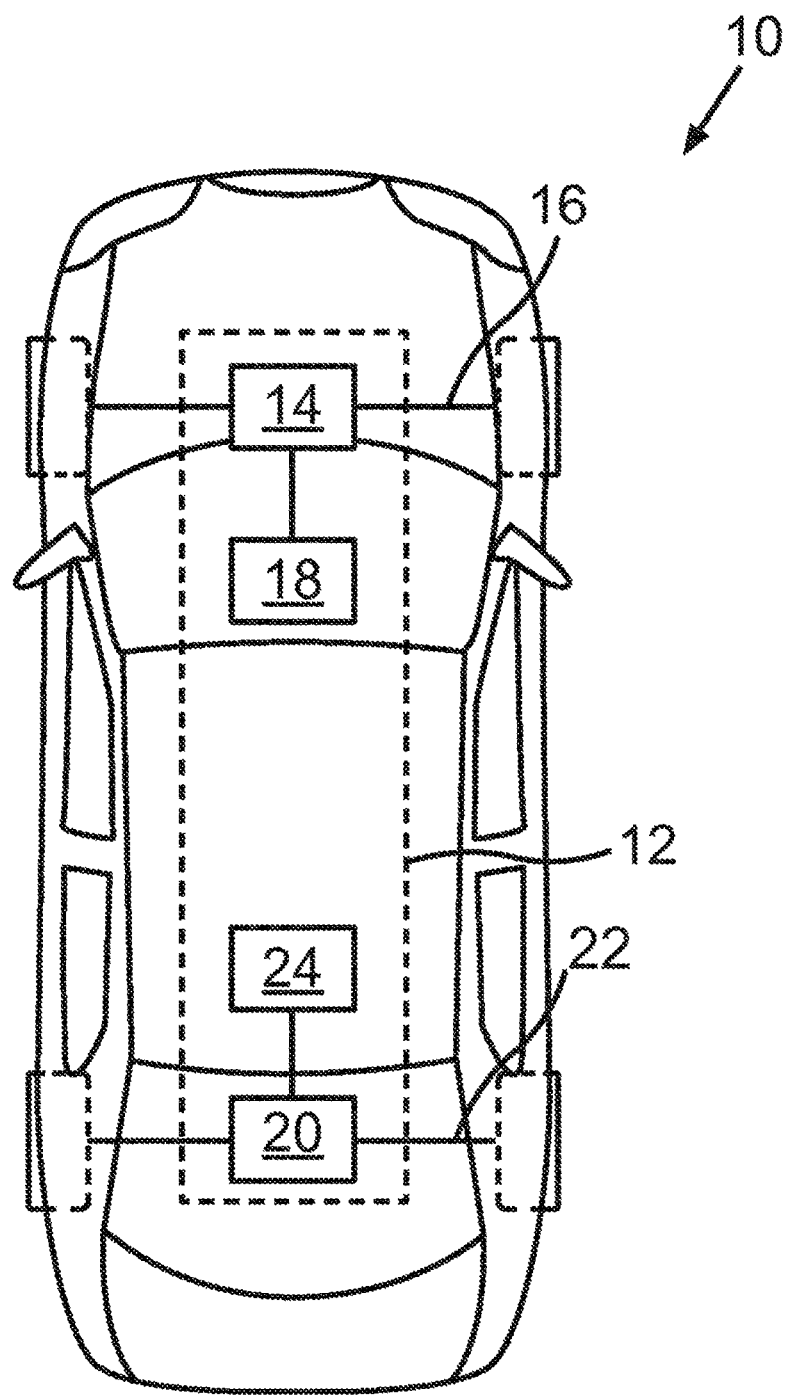

ALL-WHEEL SYSTEM FOR AN ELECTRIC MOTOR VEHICLE, AND METHOD FOR OPERATING AN ALL-WHEEL SYSTEM OF SUCH A VEHICLE

FIELD

The disclosure relates to an all-wheel system for a motor vehicle and to a method for operating an all-wheel system of a motor vehicle.

BACKGROUND

Today's electric all-wheel systems are usually torque-controlled. The electronic power units of the respective electric axle drives are each provided with a target torque. The sum of the torques provided to the electronic power units reflects the sum of the drive torque desired by the driver or the torques released by the drive slip control. The all-wheel drive changes the distribution of these drive torques on the basis of variables such as yaw rate, longitudinal acceleration and or steering angle with the aim to improve drivability. Another control goal usually consists in the targeted adjustment of a differential rotational speed or a differential slip between the two drive axles. The basis for this is usually respective information from wheel rotational speed sensors. On the basis of this information, the torque distribution is changed and the torque is shifted away from the axle that turns too fast to the other axle.

This results in a relatively slow control loop for the rotational speed control of such purely electric all-wheel systems compared to the control speed of electric machines. Compared to the coupling of two drive axles by means of couplings, as in conventional all-wheel systems with only one internal combustion engine, electric all-wheel systems have a speed disadvantage in engaging.

DE 11 2013 003 790 T5 describes an electric drive with a rotational speed control system. The electric drive comprises an electric machine which is coupled to a power source via a coupling. The power source may comprise a diesel engine, a gasoline engine, or a natural gas engine. The electric machine can be driven by means of the power source via the coupling and thereby deliver electrical energy. Alternatively, the electric machine may also drive the power source to start it. The rotational speed control system controls the rotational speed of the electric machine on the basis of a comparison between a measured rotational speed and a specified target rotational speed of the electric machine, and generates a torque command for the electric machine on the basis of the comparison.

DE 11 2014 002 414 T5 shows a hybrid vehicle having an internal combustion engine for driving a front axle and having an electric motor for driving a rear axle of the hybrid vehicle. An actual rotational speed of the electric motor can be adapted to a specified target rotational speed.

DE 10 2011 111 775 A1 shows a hybrid vehicle having an internal combustion engine and two electric drive motors. A PID control controls the electric drive motors electric machines based on their torque and their rotational speed values, harmonizes rotational speeds and reduces vibrations.

SUMMARY

It is the object of the present invention to provide a particularly responsive all-wheel system for a motor vehicle, the axes of which are driven by respective electric machines.

This object is achieved by an all-wheel system for a motor vehicle and by a method for operating an all-wheel system of a motor vehicle having the features of the independent claims. Advantageous embodiments with expedient and non-trivial developments of the invention are specified in the dependent claims.

The all-wheel system according to the invention for a motor vehicle comprises a first electric machine for driving a first drive axle of the motor vehicle. In addition, the all-wheel system comprises a first electronic power unit for controlling a rotational speed of the first electric machine. Further, the all-wheel system according to the invention has a second electric machine for driving a second drive axle of the motor vehicle and a second electronic power unit for controlling the rotational speed of the second electric machine on the basis of a rotational speed of the first electric machine and a specified differential rotational speed between the first electric machine and the second electric Machine.

The all-wheel system according to the invention is thus characterized by the fact that a specified differential rotational speed between the two electric machines is used to control the all-wheel system. Said differential rotational speed I provided to the two electronic power units. The first electronic power unit is defined as primary electronic power unit. The second electronic power unit is adapted to set the rotational speed of the associated second electric machine on the basis of the rotational speed of the first electric machine and the specified differential rotational speed.

By specifying the rotational speed difference with respect to the two electric machines, a difference in terms of the two drive axles is also indirectly taken into account, at least as long as the two electric machines are coupled to the respective drive axles. Since both drive axles can be driven, one does not know the absolute speed of the two drive axles in terms of an absolute translational speed corresponding to the travel speed of the respective motor vehicle, at least as long as the two drive axles are driven by the two electric machines. Therefore, it is specified by the invention to take into account the differential rotational speed between the two drive axles and thus also between the two electric machines, i.e., to measure a differential slip. With regard to the regulation of the all-wheel system, therefore, the ratio of the respective rotational speeds of the two drive machines and thus of the two drive axles is relevant.

Thus, by means of the all-wheel system according to the invention, virtually a conventional all-wheel system with a coupling between a first and second drive axle of the motor vehicle is virtually simulated. The all-wheel system according to the invention behaves essentially like a conventional all-wheel system of a motor vehicle with an internal combustion engine and two driven axles, between which a coupling is arranged.

By means of the all-wheel system according to the invention, a particularly rapid adjustment of differential rotational speeds between the two driven axles of the motor vehicle can be achieved. As a result, there is an improved traction and a reduction of the wheel slip in the motor vehicle, in which the all-wheel system according to the invention is used. In addition, by means of the all-wheel system according to the invention, a coupling of the axle rotational speeds of the two drive axles analogous to a mechanical coupling system, i.e., as in a conventional all-wheel system with an internal combustion engine, is possible.

Preferably, respective rotational speed sensors of the electric machines are utilized, since these react much faster than wheel rotational speed sensors. For in electric machines usually the rotational speed is scanned in the kilohertz range, so that the respective rotational speed differences between the two electric machines, and thereby between the two drive axles, can be detected with a particularly high sampling rate. As a result, rotational speed differences between the two drive axles can be adjusted particularly fast by means of the all-wheel system according to the invention. By means of the all-wheel system according to the invention, oversteering or overshooting of a regulation or control circuit of the all-wheel system by unfavorable regulation of the rotational speeds of the two electric machines is also considerably reduced or completely prevented.

An advantageous embodiment of the invention provides that the second electronic power unit controls the rotational speed of the second electric machine such that the rotational speed of the second electric machine is smaller than the sum of the rotational speed of the first electric machine and the specified differential speed. In other words, it can thus be defined that only deviations in one direction are to be compensated, namely that the rotational speed of the second electric machine is always smaller than the rotational speed of the first electric machine plus the specified differential rotational speed. As a result, if necessary, only one torque on the second drive axle of the motor vehicle would be reduced.

Alternatively, it is also possible that the second electronic power unit is adapted to control the rotational speed of the second electric machine such that the rotational speed of the second electric machine corresponds to a sum of the rotational speed of the first electric machine and the specified differential rotational speed. Thus, deviations of the rotational speed in both directions, i.e. between the two drive axles of the motor vehicle can be regulated. As a result, a torque reduction result does not only result exclusively but also a torque redistribution between the two drive axles of the motor vehicle.

In a further advantageous embodiment of the invention, it is provided that the two electronic power units are adapted to control the electric machines such that a reduction of a drive torque on one of the electric machines leads to a corresponding increase in the drive torque to the other electric machine. A reduction of the drive torque at the second drive machine thus leads to a corresponding increase in the drive torque, which is provided by means of the first electric machine and vice versa. The total drive torque, which is provided by the two electric machines, thus remains constant. A redistribution of the respective drive power between the first drive axle and the second drive axle thus does not lead to torque losses and power losses. As a result, a motor vehicle equipped with the all-wheel system can be moved particularly dynamically, wherein the maximum useful power of the two electric machines can be used to drive the motor vehicle.

A further advantageous embodiment of the invention provides that the two electronic power unit are adapted to additionally control the two electric machines according to a specified torque distribution between the drive axles. Preferably, it is therefore provided to take into account in addition a torque distribution in the control and/or regulation of the all-wheel system in addition to the specification of the differential rotational speed. Due to the combined torque and rotational speed control or regulation, the power and force distribution between the two driven axles can be set optimally and particularly dynamically.

According to a further advantageous embodiment of the invention, it is provided that the second electronic power unit is adapted to control the rotational speed of the second electric machine, taking into account at least one target rotational speed for at least one of the two drive axles by means of traction control of the motor vehicle. The same may also apply for the first electronic power unit analogously, so that it can also be adapted to control the rotational speed of the first electric machine, taking into account a traction control of the motor vehicle. The adaptation of the respective rotational speeds of the two electric machines can therefore also be utilized to realize a particularly good traction control of the motor vehicle. For this purpose a calculated target speed is set off against a minimum formation with the target rotational speed specified on the traction control side, at the second electronic power unit. As a result, the two functions are compatible via a corresponding rotational speed interface.

According to a further advantageous embodiment of the invention, it is provided that the two electric machines each have the same maximum power as a traction battery of the motor vehicle. This makes it possible to distribute 100% of the power deliverable by means of the traction battery to the respective electric machines alone. In extreme cases, it is therefore possible to drive only one of the two axles by means of the respective associated electric machine, if required by the framework conditions. The sum of the power that can be provided by both electric machines is therefore preferably twice as large as the power which can be provided by means of the traction battery of the motor vehicle. For example, if the traction battery has a drive power of up to 100 kW, the two electric machines each also have a maximum power of 100 kW. This makes it possible to virtually block the all-wheel system virtually 100%.

A further advantageous embodiment of the invention provides that the two electronic power units have a common intermediate circuit. As a result, the two electronic power unit can communicate very quickly with one another, as a result of which the all-wheel system can react in a particularly responsive manner in order to distribute torques and rotational speeds between the two electric machines. In principle, it is advantageous if the two electronic power unit have a very fast data connection, for example, by being configured as a unit with a direct signal communication.

The motor vehicle according to the invention comprises the all-wheel system according to the invention or an advantageous embodiment of the all-wheel system according to the invention.

In the method according to the invention for operating the all-wheel system according to the invention or an advantageous embodiment of the all-wheel system according to the invention, the electronic power unit controls the rotational speed of the second electric machine on the basis of a rotational speed of the first electric machine and a specified differential rotational speed between the first electric machine and the second electric machine. Advantageous embodiments of the all-wheel system according to the invention are to be regarded as advantageous embodiments of the method according to the invention, wherein the all-wheel system has in particular means for performing the method steps.

Further advantages, features and details of the invention will become apparent from the following description of a preferred exemplary embodiment and from the drawing. The features and combinations of features mentioned above in the description as well as the features and combinations of feature mentioned below in the description of the FIGURE and/or shown in the single FIGURE can be used not only in the respectively indicated combination but also in other combinations or alone, without departing from the scope the invention.

The drawings show in the single FIGURE a schematic representation of a motor vehicle 10 with an all-wheel system 12. The motor vehicle 10 shown here is a purely electrically driven motor vehicle. The all-wheel system 12 comprises a first electric machine 14 for driving a first drive axle 16 of motor vehicle 10. Furthermore, all-wheel system 12 has a first electronic power unit 18 for controlling electric machine 14. In addition, all-wheel system 12 comprises a second electric machine 20 for driving a second drive axle 22 of motor vehicle 10. Furthermore, all-wheel system 12 also has a second electronic power unit 24 for controlling second electric machine 20.

BRIEF DESCRIPTION OF THE DRAWINGS

FIG. 1 shows a schematic representation of a motor vehicle with an all-wheel system.

DETAILED DESCRIPTION

The motor vehicle 10 shown here is a purely electrically driven motor vehicle. The all-wheel system 12 comprises a first electric machine 14 for driving a first drive axle 16 of motor vehicle 10. Furthermore, all-wheel system 12 has a first electronic power unit 18 for controlling electric machine 14. In addition, all-wheel system 12 comprises a second electric machine 20 for driving a second drive axle 22 of motor vehicle 10. Furthermore, all-wheel system 12 also has a second electronic power unit 24 for controlling second electric machine 20.

The two drive axles 16, 22 are, since they can be driven separately via respective electric machines 14, 20, not coupled to each other via a coupling, as is required in conventional all-wheel systems in motor vehicles with an internal combustion engine. The two electronic power units 18, 24 can each control the two electric machines 14, 20 separately in order to provide a corresponding power and a corresponding torque to drive axles 16, 22, depending on the driver's desire.

In order to allow a particularly dynamic and responsive control of all-wheel system 12 without an overshoot of the all-wheel system 12 caused by control or regulation technology, it is provided that second electronic power unit 24 is adapted for controlling the rotational speed of second electric machine 20 on the basis of a rotational speed of first electric machine 14 and a specified differential rotational speed between first electric machine 14 and second electric machine 20. It is therefore provided to control the two electric machines 14, 20 on the basis of how large a rotational speed slip between the two electric machines 14, 20 is at the moment.

This has the advantage that respective rotational speed sensors within electric machines 14, 20 are utilized, which have a particularly high sampling rate in the kilohertz range. In contrast to the measurement and consideration of the actual wheel rotational speeds at which the sampling rate is usually many times lower, this makes it possible to respond very quickly to rotational speed differences between driven axles 16, 22. In addition, the rotational speed regulation or rotational speed control of the two driven axles 16, 22 has the advantage that such a rotational speed regulation or rotational speed control is much more agile than a purely torque-based control or regulation of the two electric machines 14, 20.

In addition, it can also be provided that additionally a torque regulation of the two electric machines 14, 20 is provided. A drive torque that is reduced in first electric machine 14 is preferably automatically supplied accordingly by second electric machine 20 and vice versa. The total drive torque provided by the two electric machines 14, 20 thus remains constant—as far as it can be implemented in terms of traction technology and thus makes sense.

The control or regulation of the two electric machines 14, 20 may additionally be coupled to a traction control of motor vehicle 10, not shown here. The control of the two electric machines 14, 20 thus additionally takes place on the basis of the specifications of a traction control. The traction control system can, for example, specify a target rotational speed for the respective drive axles 16, 22, which depends on the absolute speed of motor vehicle 10. The electronic power units 18, 24 then control the two electric machines 14, 20 in such a way that the specified target rotational speed for the two axles 16, 22 is not exceeded, since otherwise a respective wheel slip would occur on the drive axles 16, 22. The two electronic power units 18, 24 can therefore make a particularly fast and responsive rotational speed adjustment at the two electric machines 14, 20 and also the electronic power units 18, 24 additionally can realize a redistribution of the drive torques provided by the electric machines 14, 20.

Since the two electric machines 14, 20 each have the same maximum power as the traction battery, a hundred percent virtual blocking effect between the two driven axles 16, 22 is possible. The total power that can be provided by the traction battery can thus be provided, if required, either by first electric machine 14 or by second electric machine 20 alone. For example, should the case occur that first drive axle 16 with its wheels is on ice and second driven axle 22 stands on easy-grip asphalt, it would be possible to provide the full drive power exclusively by means of second electric machine 20. Overall, a solution is provided by described all-wheel system 12, by means of which rotational speed differences, i.e. a rotational slip between two driven axles can be compensated particularly quickly, so as to allow a particularly fast and dynamic and safe drive of a motor vehicle.

The invention claimed is:

1. An all-wheel system for a motor vehicle, comprising:
   a first electric machine for driving a first drive axle of the motor vehicle;
   a first electronic power unit for controlling a rotational speed of the first electric machine;
   a second electric machine for driving a second drive axle of the motor vehicle; and
   a second electronic power unit for controlling a rotational speed of the second electric machine,
   wherein the rotational speed of the second electrical machine is set based on at least (1) the rotational speed of the first electric machine and (2) a prescribed difference in rotational speed between the first electric machine and the second electric machine.

2. The all-wheel system according to claim 1, wherein the second electronic power unit is adapted to control the rotational speed of the second electric machine such that the rotational speed of the second electric machine is smaller than a sum of the rotational speed of the first electric machine and the prescribed difference in rotational speed.

3. The all-wheel system according to claim 1, wherein the second electronic power unit is adapted to control the rotational speed of the second electric machine such that the rotational speed of the second electric machine corresponds to a sum of the rotational speed the first electric machine and the prescribed difference in rotational speed.

4. The all-wheel system according to claim 1, wherein the two electronic power units are adapted to control the electric machines to reduce a drive torque on one of the two electric machines and correspondingly increase the drive torque on another of the two electric machines.

5. The all-wheel system according to claim 1, wherein the two electronic power units are adapted to additionally control the two electric machines in accordance with a specified torque distribution between the drive axles.

6. The all-wheel system according to claim 1, wherein the second electronic power unit is adapted to control the rotational speed of the second electric machine taking into account at least one target rotational speed for at least one of the two drive axles specified by means of traction control of the motor vehicle.

7. The all-wheel system according to claim 1, wherein the two electric machines each have at least the same maximum power as a traction battery of the motor vehicle.

8. The all-wheel system according to claim 1, wherein the two electronic power units have a common intermediate circuit.

9. A method for operating the all-wheel system according to claim 1, wherein the second electronic power unit controls the rotational speed of the second electric machine based on the rotational speed of the first electric machine and the prescribed difference in rotational speed between the first electric machine and the second electric machine.

\* \* \* \* \*